United States Patent [19]

Hitchcock

[11] Patent Number: 5,087,395

[45] Date of Patent: Feb. 11, 1992

[54] METHOD FOR PROCESSING RADIATION CROSS-LINK THIN FILM FOAM

[75] Inventor: Martin K. Hitchcock, Newark, Ohio

[73] Assignee: The Dow Chemical Company, Midland, Mich.

[21] Appl. No.: 551,823

[22] Filed: Jul. 12, 1990

[51] Int. Cl.⁵ .............................................. B29C 67/20
[52] U.S. Cl. ........................................ 264/22; 264/54
[58] Field of Search ............. 264/22, 41, 288.8, 290.2, 264/51, 54

[56] References Cited

U.S. PATENT DOCUMENTS

| | | | |
|---|---|---|---|
| 3,471,604 | 10/1969 | Butcher | 264/288.8 |
| 3,711,584 | 1/1973 | Sagane | 264/54 |
| 4,124,344 | 11/1978 | Kiyono et al. | 425/174.4 |
| 4,213,925 | 7/1980 | Kiyono et al. | 264/22 |
| 4,486,366 | 12/1984 | Reddy | 264/53 |
| 4,508,669 | 4/1985 | Iwai et al. | 264/51 |
| 4,704,238 | 11/1987 | Okuyama et al. | 264/288.8 |

Primary Examiner—James Lowe

[57] ABSTRACT

A foamed thermoplastic resin sheet is produced by a process comprising preheating in a chamber including a conveyor means for continuously conveying a radiation cross-linked thermoplastic resin sheet containing a blowing agent in a horizontally supported state and foaming said sheet in an expansion oven over a hot air blanket while continuously conveying said radiation cross-linked thermoplastic resin sheet in a horizontally supported state while applying a uniform tension across the width of the foamed sheet.

13 Claims, 4 Drawing Sheets

METHOD FOR PROCESSING RADIATION CROSS-LINK THIN FILM FOAM

BACKGROUND OF THE INVENTION

The present invention relates to thin sheet foamed products, especially radiation cross-linked thin sheet olefin polymer or copolymer foamed products. Thin sheet foamed products are typically products having a thickness in the range from 1/16 to ¼ inch, and which undergo expansion to a final density of approximately two pounds per cubic foot (pcf).

Foam sheets having a thickness greater than ¼ of an inch are typically expanded in a horizontal oven, generally over a cushion of air, which supports the foam in the oven as it expands Unfortunately, such horizontal hot air, floating foam expansion ovens do not operate satisfactorily in the expansion of thinner sheets, that is, sheets of less than about ¼ inch thickness. The thinner sheets tend to fold over on themselves and wrinkle as they are expanded in horizontal ovens.

One particular type of foam which has to be expanded in relatively thin films is radiation cross-linked polyolefin or polyolefin copolymer foam. Radiation is an effective cross linker only up to thicknesses of about ¼ of an inch. Radiation cross-linked foams are particularly desired in the health care industry, primarily for aesthetic reasons; their fine cells, smooth surface and soft feel make them superior to chemically cross-linked foam.

To overcome wrinkling and folding problems associated with thin sheet expansion in a horizontally oriented hot air foam expansion oven, cross-linked thin sheets have been expanded in a vertically oriented tentering frame. Such vertical expansion devices are disclosed in U.S. Pat. Nos. 4,124,344 and 4,231,925. These vertical expansion devices have the advantage of eliminating fold-over and wrinkles in the thin sheet foam product.

Cross-linked thin sheet foam products tend to be oriented non-uniformly across their width. Orientation, in turn, negatively affects thermoforming of the film into a desired end product, since the foam, when heated during the thermoforming, releases stresses which were induced during the foam's manufacture All foams possess this orientation to a greater or lesser degree; the problem arises from inconsistent orientation. This is especially noticeable where a wide roll of film, for example, 60 inches wide, may be slit into four to six separate rolls. The change in orientation across the original 60 inch sheet results in the separate rolls having decidedly different thermoforming characteristics because of the non-uniform orientation across the width of the foam sheet.

SUMMARY OF THE INVENTION

In accordance with the present invention, it has been surprisingly discovered that, unlike other thin foam sheets, thin sheet radiation cross-linked polyolefin foams can be processed in a horizontally disposed, hot air, foam expansion oven. Even more surprising is the discovery that thin foam sheets thus produced are oriented uniformly across the width of the sheet. The uniform orientation of the thus produced radiation cross-linked thin sheet rolls makes them more readily thermoformable and, when the larger rolls are slit to make several narrower rolls, each of the narrower rolls can be treated identically during thermoforming operations.

BRIEF DESCRIPTION OF THE DRAWINGS

The present invention is described in greater detail by reference to the accompanying drawings in which.

DETAILED DESCRIPTION OF THE PREFERRED EMBODIMENT

Figure 1:
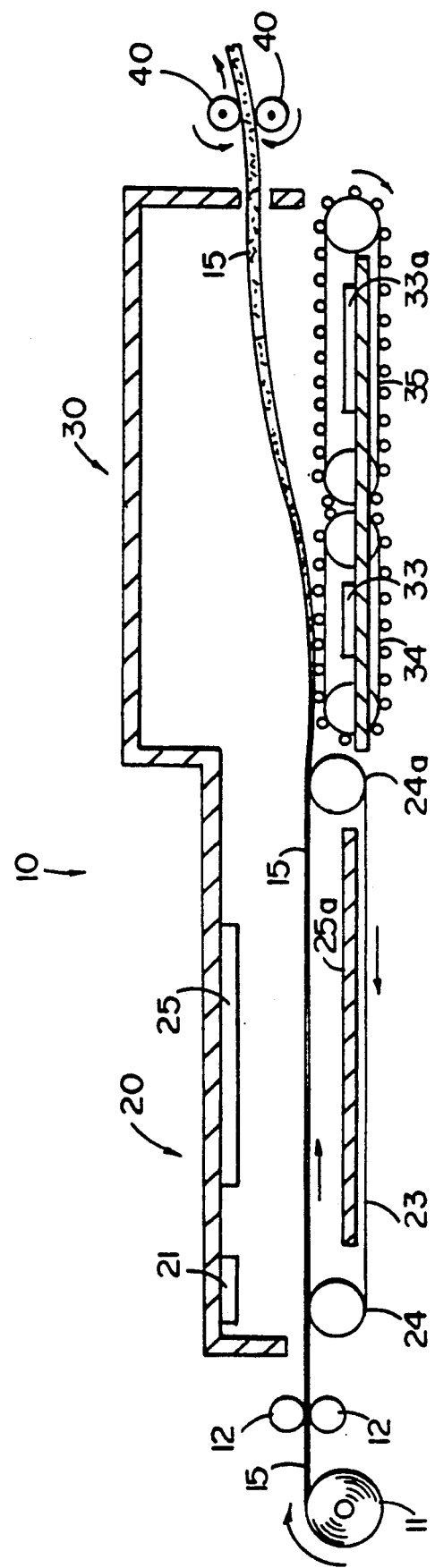
FIG. 1 is a longitudinal sectional view of a preferred embodiment of an apparatus for carrying out the process of the invention.

In the preferred embodiment, the process of the present invention comprises heating a thin sheet radiation cross-linked polyolefin thermoplastic resin sheet containing a heat-decomposable blowing or expansion agent to a temperature lower than the decomposition temperature of the blowing agent to soften the sheet while it is being conveyed in a horizontal state and then heating the sheet to a temperature above the decomposition temperature of the blowing agent while suspending the sheet over a hot air blanket while the sheet is being conveyed horizontally and applying to the leading edge of the expanded sheet as it issues from the expansion chamber a tension which is uniform across the leading edge of the sheet.

In contrast to current commercial practice, which employs a vertical expansion oven in combination with a vertical tentering frame that subjects the expanding foam sheet to transverse tensile forces, the present invention employs a horizontal oven 10. More particularly, in accordance with the present invention, the expandable sheet 15 is preheated in an infrared or equivalent preheating chamber 20 while being conveyed horizontally through the preheat section, after which the sheet enters a hot air expansion chamber 30 in which it is transported horizontally while being supported substantially by jets of hot air. The oscillating action instituted by the hot air jets maintains the sheet in a generally flat state. Tension is applied uniformly to the leading edge of the foam sheet by nip rollers 40 as it exits the horizontally disposed oven. This produces a foam that has a substantially uniform orientation across the sheet and results in a foamed sheet that can be treated identically across its width without ill effects to the fabricator. The sheet foams produced by the present invention do not have a strong directional change in orientation across their width.

A radiation cross-linked thermoplastic resin sheet 15 containing a blowing agent is first fed to the preheating chamber 20 continuously from roll 11 by means of a pair of feed rolls 12, and preheated within the preheating chamber 20. The thermoplastic resin sheet 15 is preferentially cross-linked off-line by exposure to a suitable radiation source, such as ultraviolet light, and is preferably a source of radioactive rays, such as electron beams, X-ray, Beta-ray, and Gamma-ray. The dosage of the ionizing radiation is not limited, and is typically in the range of 0.5 to 20 Mrads, and preferably in the range of 2 to 10 Mrads. Within the preheating chamber 20 is provided a conveyor means 22, such as a belt conveyor, comprising an endless belt 23 and drive wheels 24 and 24a, upper heating means 25 and, optionally but preferably, lower heating means 25a. Endless belt 23 is extended horizontally between pulleys 24, 24a. Sheet 15 is placed on belt 23 and supported thereon horizontally. Endless belt 23 is preferably made of material which can withstand use for long periods of time at the temperature of the preheating chamber, such as vulcanized rubber belting or glass fiber belting. Preferably, the surface of endless belt 23 is surface treated to have good releasability, so that sheet 15, which is softened as a result of preheating, will not stick to the belt. For example, this can be accomplished by coating with a fluorinated resin or a mold releasing agent such as silicone oils.

Conveyor means 22 is not limited to the belt conveyor described, but may be any other type which can continuously convey the sheet 15 in a horizontal state. For example, a roller conveyor, or means adapted to convey the sheet 15 while holding both edges thereof can also be used. The belt conveyor is, however, especially preferred since it has a large area of contact with the sheet 15.

As cross-linkable sheet 15 enters preheat section 20, it is exposed to heating means 25 and 25a where sheet 15 is preheated as it is conveyed by the conveyor means continuously in the horizontally supported condition. An infrared ray source, electric heater, or jet of hot air, etc., may be used as needed as a heat source for the heating means. As shown, heating means 25 may be provided above and heating means 25a beneath the endless belt on which sheet 15 is placed. This manner of arrangement of the heating means within preheating chamber 20 is preferred because it helps insure uniform preheating of both surfaces of sheet 15.

The speed of conveyor means 22 is determined according to the correlation between preheating temperature, heat-foaming temperature, the length of each chamber, and the type of the resin forming sheet 15, and will vary accordingly. Generally, the conveying speed should be sufficient to permit full preheating of sheet 15 within preheating chamber 20.

For the production of a foam sheet of good quality, it is desirable to preheat sheet 15 to a temperature sufficiently low that sheet 15 does not foam in chamber 20, but sufficiently high that, under the influence of further heating, it immediately begins to foam when it has left preheat chamber 20 and enters foaming chamber 30.

Foaming chamber 30 is directly connected to the exit area of preheating chamber 20. Preheated sheet 15 from preheating chamber 20 is heat foamed in foaming chamber 30 to form a foamed sheet. A pair of heaters 33 and 33a are provided inside foaming chamber 30, and the preheated sheet is heated to a temperature above the decomposition temperature of the blowing agent during passage of the sheet through the expansion oven. Heaters 33 and 33a comprise forced air jets which provide a plurality of streams of heated air which support the sheet as it expands during its horizontal conveyance through the foaming chamber.

Foaming chamber 30 is provided with two separate conveyor means 34 and 35 which are operated at different speeds. The relative speed of the foamed sheet tends to increase with the degree of foaming with the maximum velocity of the sheet being attained at the maximum foam rate. Accordingly, the two conveyors are operated at a speed approximating the speed of the foam sheet through each section of the foaming chamber. While the sheet as it foams is generally supported by the hot air in a generally flat condition above conveyors 34 and 35, the conveyors are intended to advance sheet 15 forward should it come into contact with conveyors 34 or 35 during its passage through the foaming section. Because the differential rate of foaming can cause some wrinkling of the sheet, as the sheet exits foaming oven 30, it is nipped between pull rollers 40 which advance at a rate of speed roughly equivalent to the forward rate of sheet 15 in order to maintain a substantially even pull on sheet 15 across the face of sheet 15. Sheet 15 is cooled by cooling rolls which are not shown, and taken up by a take-up means consisting of a pair of pinch rolls (not shown) prior to being wound up, and cut (also not shown) to finished products.

The thermoplastic resin sheet containing the heat-decomposable blowing agent and, when needed, a cross-linking agent, can be produced by extrusion molding a mixture comprising a thermoplastic resin, heat-decomposable blowing agent and cross-linking agent into the desired size in a customary manner.

Particularly preferred thermoplastic resins are homopolymers and copolymers of at least one mono-olefinically unsaturated monomer, and including unsaturated monomers which are copolymerizable with mono-olefinically unsaturated monomers including low density polyethylene, medium density polyethylene, high density polyethylene, hybrid polyethylenes having both a branched and linear structure, ethylene-vinylacetate copolymers, ionomers, ethylene-propylene copolymer, ethylene-butadiene copolymer, ethylene-butene copolymer, ethylene-vinylchloride copolymer, polyvinyl chloride, linear low density polyethylene, ultra low density polyethylene-octene copolymers, blends of low density polyethylene and ethylene-vinylacetate copolymer, blends of low density polyethylene and linear low density polyethylene, ethylene-ethylacrylate copolymers, ethylene-acrylic acid copolymers, high density polyethylene, and blends of high density polyethylene and low density polyethylene. The low density polyethylene and ethylene-vinylacetate copolymers are especially preferred. These thermoplastic resins preferably have an average molecular weight of 10,000 to 300,000. If desired, elastomers such as natural rubber, butyl rubber, polyisobutylene, styrene-butadiene rubber, polybutadiene, or polyisopropylene may be added to the thermoplastic resin compositions.

The heat-decomposable blowing agents are compounds which are solid at room temperature, have a higher decomposition temperature than the molding temperature of the resin used, and, when heated to a temperature above the decomposition temperature, decompose while evolving a gas such as nitrogen, carbon dioxide, carbon monoxide or ammonia. Examples of blowing agents are azodicarbonamide, metal salts of azodicarbonamide, hydrazodicarbonamide, 4,4'-oxybis (benzenesulfonyl semicarbazide), bisbenzenesulfonyl, hydrazide and N,N-dinitrosopentamethylenetetramine. The amount of the blowing agent is not limited in particular, and can be optionally determined according to the desired expansion factor. The preferred amount is 1 to 100 parts by weight, especially 1 to 80 parts by weight, per 100 parts by weight of the resin. In order to decompose the blowing agent at a suitable temperature, a conventional foaming aid, such as zinc stearate, lead stearate or boric acid may be added.

Preferably, the thermoplastic resin sheet used in the present invention is radiation cross-linked while being foamed in accordance with the practice of this invention. The method of cross-linking by radiation includes the application of ionizing radiation or ultraviolet radiation to the sheet as it is conveyed through the preheating zone.

The ionizing radiation rays are radioactive rays conventionally used for the cross-linking of synthetic resins, such as electron beams, X-rays, Beta-rays or Gamma-rays. The dose of the ionizing radiation is not limited at all and can be determined optionally according to the required degree of cross-linking. Generally, the dose is 0.5 to 20 Mrads.

In addition to the compounds described above, the thermoplastic resins may, as needed, contain conventional additives, including slip agents such as paraffin or stearic acid, fillers such as calcium carbonate or carbon black, antioxidants such as 2,6-ditertiarybutylhydroxytoluene, plasticizers such as dioctyl phthalate, and fire retardants.

The following examples and comparative examples illustrate the present invention without any intention of limiting it. All parts of these examples are by weight unless otherwise specified.

EXAMPLE 1

The following ingredients were fed into a blender, and mixed with good stirring:

| Ingredient | Amount |
| --- | --- |
| Ethylene-vinylacetate copolymer, 12% to 18% vinylacetate, melt index 2-10; | 100 parts |
| Azodicarbonamide | 15-18 parts |
| Boric acid | 0.2 parts |

Figure 2:
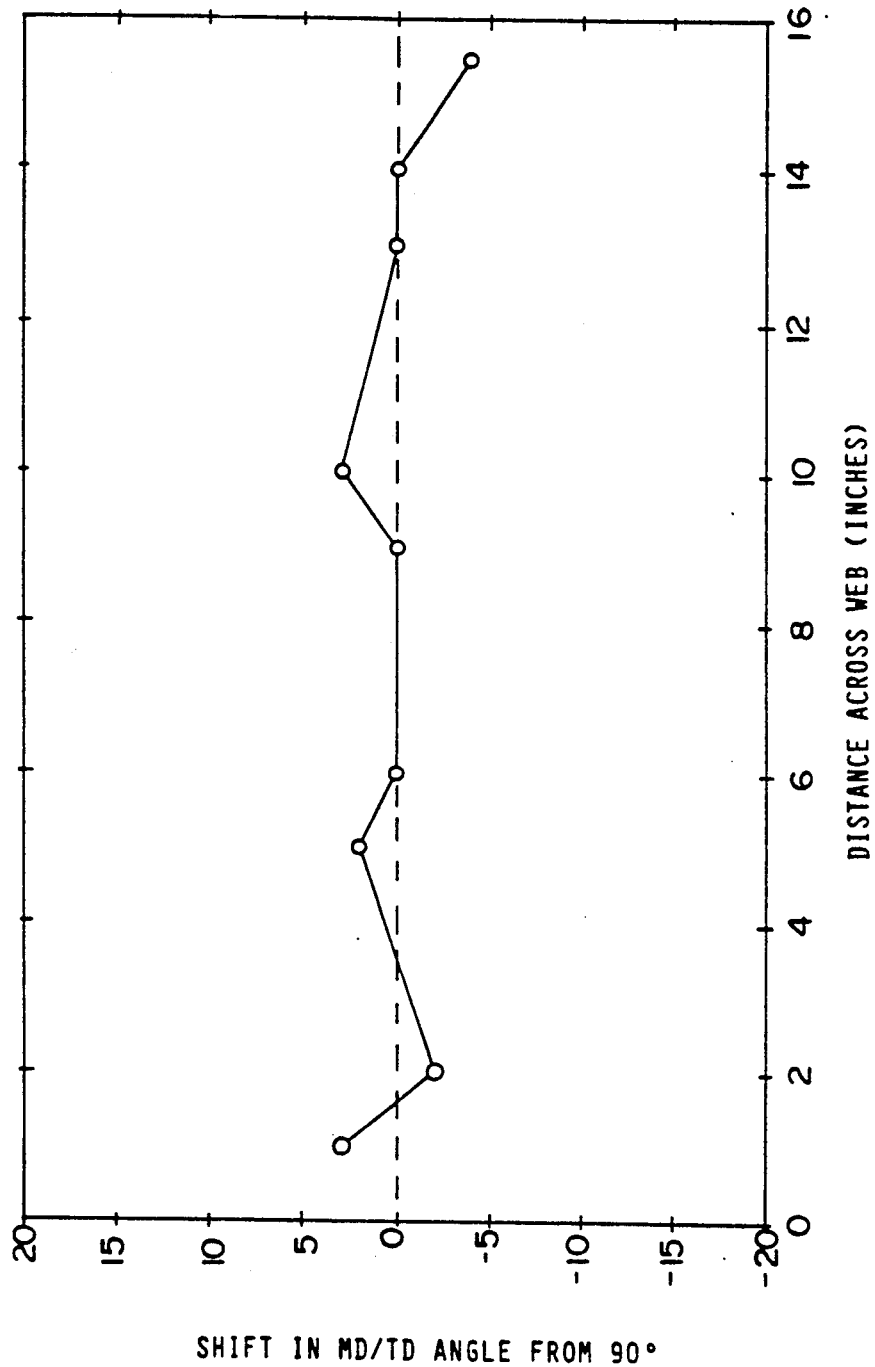
FIG. 2 is a chart of the orientation widthwise of the thin foamed sheet of Example 1.

The mixture was fed into an extruder and extruded to form a sheet having a thickness of 0.06-0.8 inch and a width of 30 inches. The sheet was fed into a horizontal hot air expansion apparatus such as disclosed in FIG. 1 and radiated with a dose of 4-10 Mrads of electron beams to cross-link the sheet. The sheet was fed into the preheating chamber at a rate of four feet per minute and conveyed horizontally through the preheat section and delivered to the hot air flotation section. The temperature of the sheet as it entered the hot air flotation section was approaching the 200°C. decomposition temperature of the azodicarbonamide blowing agent. The sheet began to expand immediately upon entering the hot air flotation section where it was contacted with hot air at a temperature of about 225° C., with the amount of air being supplied to this expansion section being sufficient to maintain the sheet above the dual two-stage conveyor system. The foamed sheet was delivered from 13 and taken up by the pull rolls which apply a uniform tension across the edge of the sheet which is just sufficient to maintain the sheet tautly. The resulting foam sheet had a thickness of 0.125 inch and a width of approximately 6 feet, and an expansion factor of about 30. The foamed sheet was tested for orientation by heating the sheet in a 135° C. oil bath. The orientation was measured by percent retained MD and TD dimension to ascertain the angle of maximum orientation versus distance across the web. The results are reported in FIG. 2. The data show that the method of the invention results in a substantially uniform orientation across the web.

COMPARATIVE EXAMPLE 1

Figure 3:
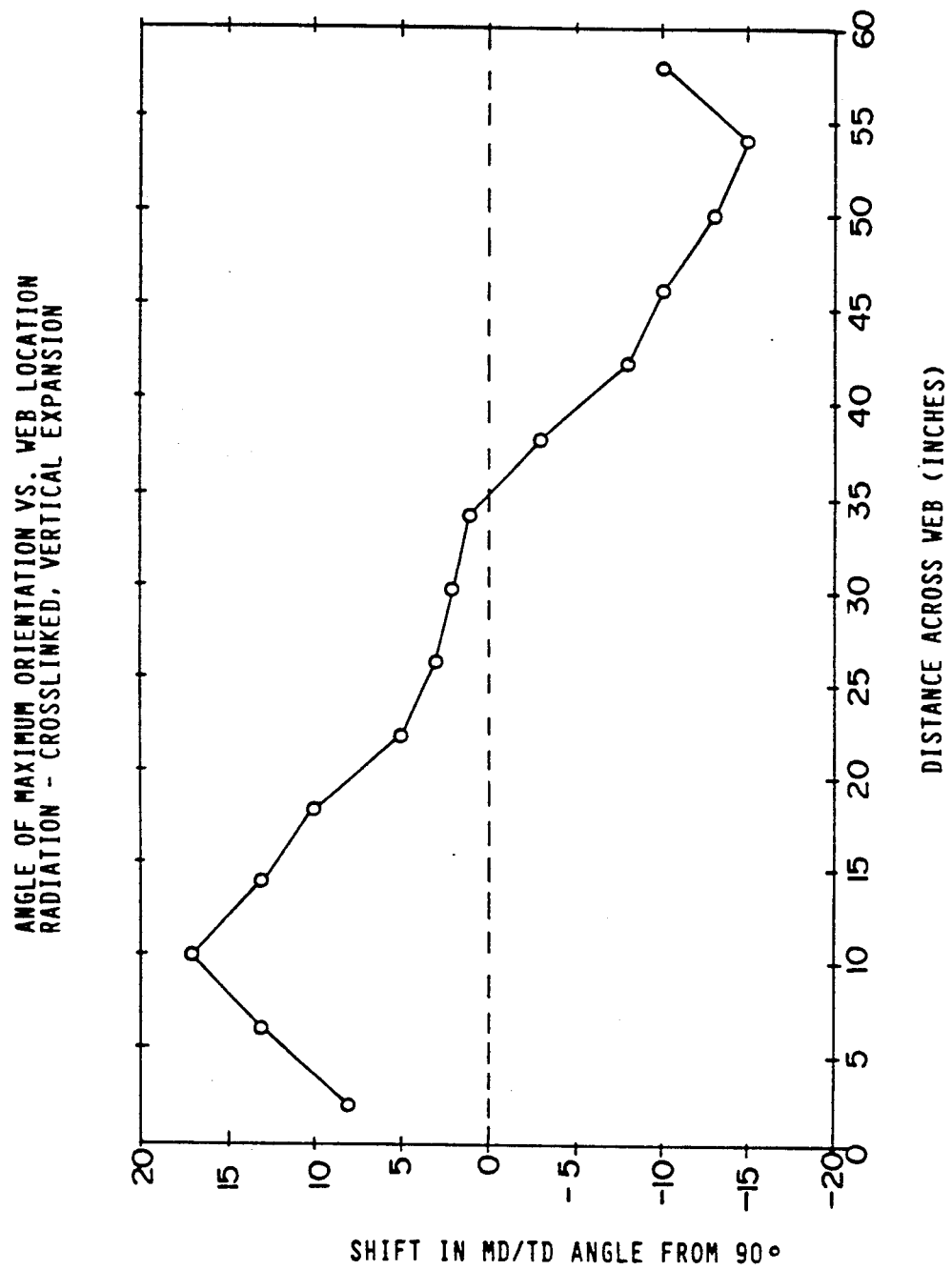
FIG. 3 is a chart of the orientation widthwise of the thin foamed sheet of Comparative Example 2.

An expandable sheet having an identical formulation to that of Example 1 was expanded in an apparatus in which the sheet was laterally tentered. While the lateral tentering was effective to prevent wrinkling of the sheet, there was a pronounced variation in orientation across the width of the foamed sheet, as shown in FIG. 3. The two pcf foam from Example 1 was similarly tested for orientation by heating in a 135° C. oil bath. As can be seen from the data in FIG. 2, the foam made by the process of the invention has uniform orientation across the width. In comparative thermoforming of the sheets of Example 1 and Comparative Example 1, the expanded sheet prepared in accordance with Example 1 had superior line speed and set-up time, resulting from its uniform stress release.

EXAMPLE 2

The following ingredients were fed into a blender and mixed with good stirring:

| Ingredient | Amount |
| --- | --- |
| Low density polyethylene | 100 parts |
| Azodicarbonamide | 17 parts |

Figure 4:
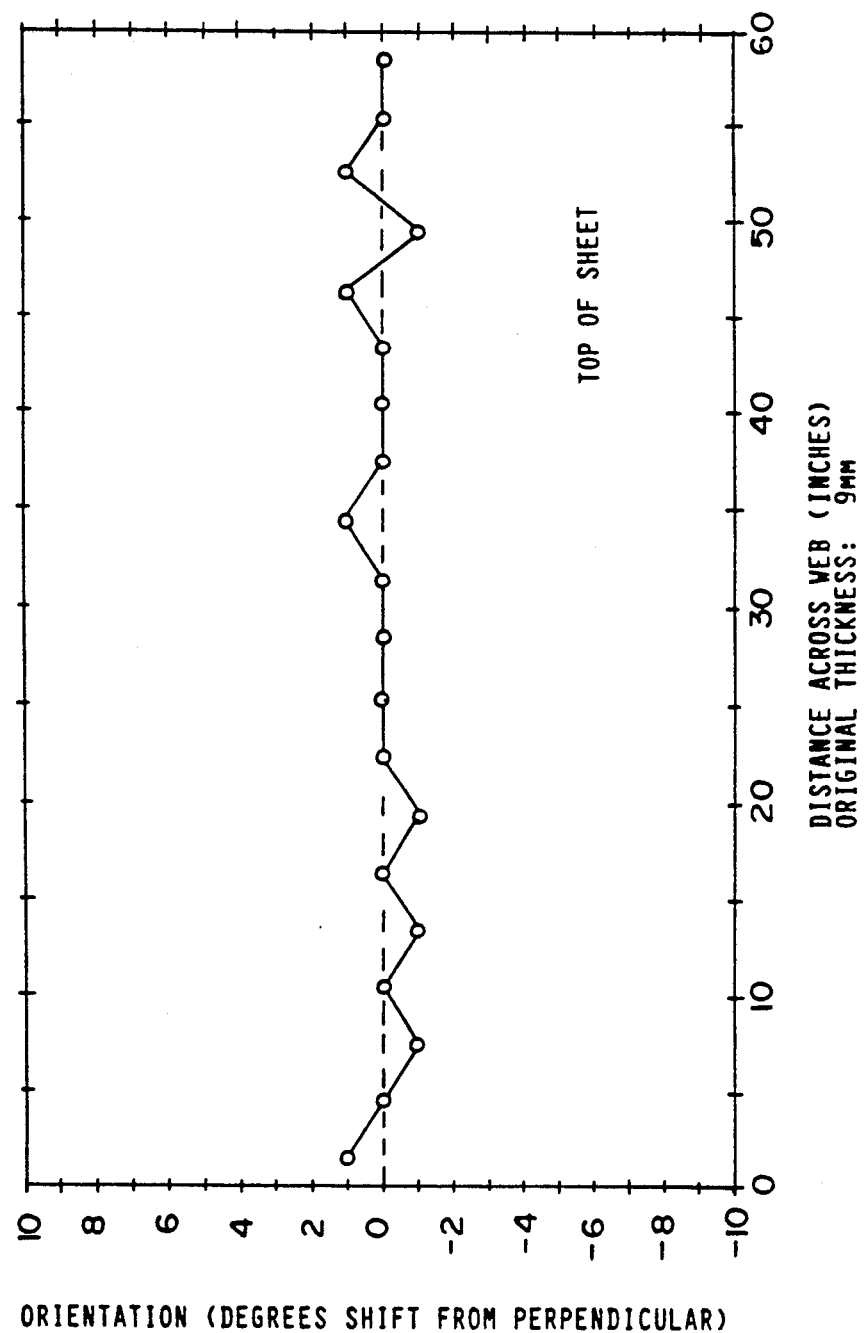
FIG. 4 is a chart of the orientation widthwise of the thin foamed sheet of Example 3.

The mixture was fed into an extruder and extruded to form a sheet having a thickness of 9 mm and a width of 30 inches. The resulting sheet was cross-linked by 4 Mrads of electron beams with a degree of cross-linking (in terms of the percent by weight of the hot xylene insoluble portion based on the entire width of the cross-linked sheet) of 41.5 percent. The sheet was foamed in the apparatus of FIG. 1 following the procedure of Example 1 to provide a foam sheet having a width of 60 inches, a final density of 2.06 pounds per cubic foot and a final thickness of 0.125 inch. The orientation test results are reported in FIG. 4. As can be seen from the reported data, the orientation is close to 0. One would anticipate that the thermoformability of the sheet would be excellent and uniform across the row.

It is understood that the above is merely representative of the preferred embodiment and that various changes can be made without departing from the spirit and broader aspects of the invention.

The embodiments of the invention in which an exclusive property or privilege is claimed are defined as follows:

1. A process for producing a radiation cross-linked, fine cell smooth foam having a thickness not greater than about ¼-inch, and said foam having a uniform orientation across the width and improved thermoformability, comprising:
    providing a radiation cross-linked thermoplastic resin sheet containing a heat-decomposable blowing agent;
    supplying said sheet onto a conveyor and conveying said sheet horizontally by means of said conveyor;
    supplying heat to said sheet while said sheet is conveyed horizontally, and heating said sheet to a temperature below the decomposition temperature of said blowing agent;
    discharging said sheet from said conveyor onto a blanket of hot air and conveying said sheet horizontally across said blanket of hot air;
    heating the thus horizontally conveyed sheet, while it continues in its horizontal orientation, to a temperature above said decomposition temperature and thereby foaming said sheet; and conveying the resulting foamed sheet from said blanket of hot air and simultaneously applying a uniform tension to the leading edge of said foamed sheet.

2. A process according to claim 1 wherein said sheet is heated from above and below said sheet to a temperature below the decomposition temperature of said blowing agent.

3. A process according to claim 1 wherein said thermoplastic resin comprises an ethylenic resin.

4. A process according to claim 3 wherein said ethylenic resin is a low density polyethylene.

5. A process according to claim 1 wherein said cross-linking is effected by ionizing radiation.

6. A process according to claim 1 which includes pulling said heated foamed sheet from said conveying means by applying a substantially even pull on said sheet across the face thereof.

7. A process according to claim 7 wherein said sheet is heated from above and below said sheet to a temperature below the decomposition temperature of said blowing agent.

8. A process according to claim 6 wherein said thermoplastic resin comprises an ethylenic resin.

9. A process according to claim 8 wherein said ethylenic resin is selected from the group consisting of low density polyethylene, linear low density polyethylene, ethylene-vinylacetate copolymer and blends of such ethylenic resins.

10. A process according to claim 6 wherein said cross-linking is effected by ionizing radiation.

11. A process according to claim 10 wherein said thermoplastic resin comprises an ethylene resin.

12. A process according to claim 11 wherein said ethylene resin is a low density polyethylene.

13. A process according to claim 1 wherein said uniform tension is applied to said leading edge across the face of said sheet.

* * * * *

UNITED STATES PATENT AND TRADEMARK OFFICE
CERTIFICATE OF CORRECTION

PATENT NO.   : 5,087,395
DATED        : February 11, 1992
INVENTOR(S)  : Martin K. Hitchcock It is certified that error appears in the above-identified patent and that said Letters Patent is hereby corrected as shown below:

In Claim 7, please delete "claim 7", and insert --claim 6--.

Signed and Sealed this

Twenty-ninth Day of June, 1993

Attest:

MICHAEL K. KIRK

*Attesting Officer*     Acting Commissioner of Patents and Trademarks